Patented Apr. 25, 1933

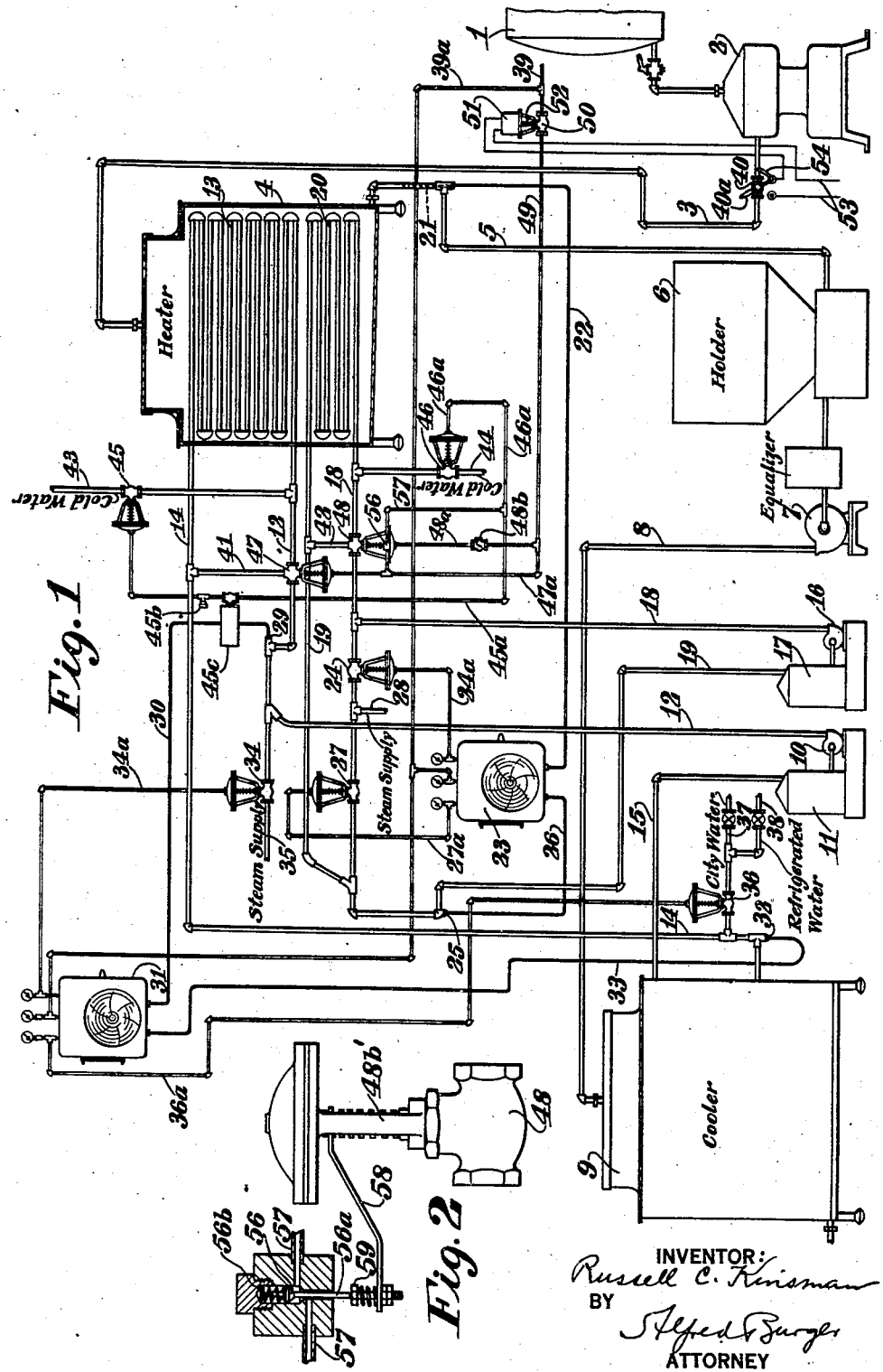

1,905,722

UNITED STATES PATENT OFFICE

RUSSELL C. KINSMAN, OF ROCHESTER, NEW YORK, ASSIGNOR TO TAYLOR INSTRUMENT COMPANIES, OF ROCHESTER, NEW YORK, A CORPORATION OF NEW YORK

MILK HEATER CONTROL

Application filed February 28, 1931. Serial No. 519,154.

This invention relates to that type of apparatus wherein a stream of milk or other liquid is passed over the surface of a tubular heater.

While apparatus of the class referred to are exceedingly well suited for subjecting a liquid, such as milk, to a uniform critical temperature with the assurance that substantially every drop of the liquid has been effectively exposed to the critical heat treatment, the disadvantage inherent in the method of treatment and in the apparatus is the formation of a deposit whenever, for one reason or another, the flow of liquid is stopped.

The tubes, which are made of stainless steel or the like, are scraped and thoroughly cleaned at the end of a day's run to make certain that effective heat exchange is maintained. However, occasional stoppages in the course of a run, as they are bound to occur cause the formation of a layer gradually increasing in thickness and heat-insulating effect more or less in proportion to the number and duration of the stoppages. The aqueous portion of the milk is progressively evaporated leaving a pasty residue in the nature of a precipitate, which adheres to the surface and gradually becomes firmly attached to and baked on the tube surfaces.

Aside from the proximate disadvantage in respect to the time and labor of scouring the tube surface, there is the incomparably greater disadvantage that the heat-insulating effect of a layer formed is an uncertain factor not subject to accurate compensation and the variable character of the heat-insulating effect makes the heat treatment of the liquid a matter of uncertainty and conjecture.

It is the object of my invention to provide means automatically operative to immediately reduce the temperature of the heating tubes so as to make the formation of a layer practically impossible or to at least minimize it, whenever a stoppage of the flow of milk or the like takes place.

For a full understanding of the invention, the principle of operation on which it is based and its advantages, reference is made to the accompanying drawing wherein Fig. 1 is a diagrammatic representation of a modern milk pasteurizing plant embodying the invention and Fig. 2 is a fragmentary view showing a detail.

In the drawing 1 represents a storage tank from which the milk passes through a clarifier 2 and then through conduit 3 to the heater 4. In the latter, the milk flows down over a series of tubes, which are interiorly heated by water as will be fully explained, and then through conduit 5 to to the rotary holder 6 from which it is forced by pump 7 through conduit 8 to the top of a cooler 9. From the cooler the milk is discharged to bottling machines for final disposition.

The cooler 9 may be and generally is structurally similar to the heater 4. The milk flows down over the surfaces of a tubular system through which the cooling water flows. To avoid waste of heat, the heat transferred from the milk in the cooling operation is utilized in the heater. To this end the cooler 9 and the heater 4 are interconnected by a circulating system including a pump 10, together with a surge tank 11, conduit 12 leading to the bottom of the upper tube section 13 in the heater and the upper end of section 13 is connected by conduit 14 to the lower end of a tube section in the cooler, while the upper end of the same section is connected by conduit 15 to the surge tank 11. A second circulating system including pump 16, surge tank 17, conduit 18 and return conduit 19 are connected with the lower section 20 of the heater.

The temperature of the milk at the outlet from the heater naturally must be accurately controlled. To this end a temperature-responsive bulb 21 is inserted in the outlet conduit 5 and is connected by the capillary 22 with the regulator 23 to control a valve 24 while a bulb 25 inserted in the conduit 19 and connected by means of capillary 26 with the regulator 23 controls a valve 27. Valves 24 and 27 control the admission of steam from a supply pipe 28 to the water circulating system through the lower section 20 of the heater. While valve 24 controls the admission of steam to the conduit 18 which leads directly to the lower section 20 of the heater, the valve 27 controls the admission of steam to the return conduit 19. Similarly a bulb 29 is inserted in the conduit 12 leading to the upper section 13 of the heater and connected by a capillary 30 to the regulator 31 and a bulb 32 is inserted in the return conduit 14, preferably close to the point of return to the cooler and connected by means of capillary 33 to the regulator 31 to control the temperature conditions in the circulating system interconnecting the cooler and the heater. While valve 34 controlled by bulb 29 regulates the admission of steam from a supply pipe 35, the valve 36 controlled by the bulb 32 regulates the admission of cold water from a supply pipe 37 connected to a city supply system or from a separate supply pipe 38 of refrigerated water.

All the valves referred to are operated in the usual way by compressed air passing from a supply pipe 39 through a conduit 39a to the regulators 23 and 31 and then through the conduits 24a, 27a, from a regulator 23 and through conduits 34a and 36a from regulator 31 to the respective valves.

The apparatus thus far described does not form any part of the invention, but has been referred to merely as a setting for the invention proper and its application. Whenever the temperature of the milk at the bottom of the heater or the temperature of the circulating systems deviates from the values for which the regulators have been set, one or the other or several of them are actuated to speedily reestablish normal conditions by admitting steam or cold water, as the case may be. The milk itself continuously flows from the tank to the outlet from the cooler. Sometimes the bottling operation, due to any one of various possible causes, lags behind the rate of speed necessary to dispose of the milk at the outlet from the cooler, and then it becomes necessary to stop the flow of milk, or some other cause makes the stoppage of the milk flow necessary. In that case a valve 40 is closed to stop the flow of milk to the heater. The milk therefore no longer flows down over the surface of the heater, but a film remains on the surface of the tubes and the aqueous constituent thereof is quickly reduced first to a viscous fluid and then, depending upon the duration of the interruption, to a tough more or less baked, carmelized or carbonized layer firmly adhering to the tube surfaces. Unless this layer be at once removed, the milk subsequently flowing over it does not come in contact with the metallic surface and does not receive the heat it normally should receive, with the result that milk at the bottom of the heater has a temperature less than normal and the valve 24 is forced to admit more steam to make up the difference, which in turn causes increased baking of the layer on the lower section 20.

I propose to provide a by-pass 41 between the conduits 12 and 14 and a by-pass 42 between the conduits 18 and 19 whereby the heating liquids, i. e. the water circulated by pumps 10 and 16 may circulate without going through the heater. In addition, I propose to connect a separate supply of cold water with each of the heater sections and cause cold water to flow through the heater sections in such quantity or for such a length of time as may be necessary to reduce the temperature of the tube walls in the heater so that baking or carmelizing or carbonizing is prevented.

A cold water supply pipe 43 is connected to the conduit 12 and a cold water supply pipe 44 is connected to conduit 18 close to the heater 4. Pipe 43 is controlled by a valve 45 and pipe 44 by a valve 46. The by-pass 41 is controlled by a valve 47 while the by-pass 42 is controlled by a valve 48. Normally these latter two valves maintain the by-passes closed but leave the conduits 12 and 18 uninterrupted. However, when a stoppage takes place in the milk flow, the conduits 12 and 18 are separated from the heater and the by-passes 41 and 42 are opened.

The valves 45, 46, 47 and 48, in the particular instance, in keeping with the general scheme of operation, are operated by compressed air derived from the supply pipe 39. A conduit 49 controlled by a valve 50 supplies the compressed air to the pneumatic motors or diaphragms associated with the valves, through the branches 45a, 46a, 47a and 48a. In practice the arrangement is such that the valve 50 is normally closed and no compressed air can flow to the diaphragms, the valves 45 and 46 being normally closed. However, as soon as valve 50 is opened, the compressed air flows to the diaphragms of the valves 45, 46, 47 and 48 to operate the latter. While valves 47 and 48 remain in the new position until valve 50 is again closed, valves 45 and 46 remain in the new position only during a predetermined relatively short period of time. As appears from the drawing, the branches 45a and 46a receive the compressed air through a valve 56 controlling a branch 57 connected to the compressed air supply in any suitable way as for instance by being connected to the branch 47a, as indicated.

Having now special reference to Fig. 2, the valve 56 is normally open permitting flow of air through conduit 57 as soon as valve 50 is opened and air has therefore access to the diaphragms of valves 45 and 46 at the same time when air flows to the diaphragms of valves 47 and 48. Valve 56, however, is controlled by the movement of the valve stem 48b' of valve 48 through an arm 58 mounted on the stem 48b' and carrying a resilient abutment 59 in contact with the stem 56a of valve 56, the stem being acted upon by a spring 56b tending to force the valve 56 upon its seat. As the valve stem 48b' is depressed by its diaphragm, it moves the arm 58 and the abutment 59 away from the valve stem 56a, allowing the valve 56 to close, whereby the flow of air through conduit 57 to the valves 45 and 46 is stopped. The branch 45a contains a leak 45b and a reservoir 45c. While the air flows to the diaphragm of valve 45, this reservoir is filled and when the valve 56 is closed, the reservoir furnishes air to the diaphragms of valves 45 and 46 and keeps the same open until the air has nearly leaked out of the leak 45b, when the valves close again. For lack of space the reservoir 45c has been shown very small, but it is understood that its size and the opening of the leak must be correlated to maintain the valves 45 and 46 open during the required period of time for effectively cooling the heater coils. The larger the reservoir capacity and the smaller the leak, the longer is, of course, the period of time during which the valves 45 and 46 remain open. While I have indicated one form of instrumentality, best suited for the particular arrangement, many other forms are readily available for accomplishing the purpose.

Valve 50 is preferably operated by a solenoid device 51 against the opposing action of a spring 52. The solenoid is energized by an electric circuit 53 through a switch arm 54 connected with the operating handle 40a of valve 40. The handle 40 is normally in the position indicated. To turn off the valve 40, the handle is turned to the right, and the switch arm 54 is thus caused to bridge the gap in the circuit to close it. Also this arrangement may be modified in many ways known in the art.

The operation, while apparent from the description, is as follows:

Whenever it is desired or becomes necessary to stop the flow of milk to the heater, the operator turns the handle 40a and in so doing he opens the valve 50. Air flows immediately to the diaphragm valves 45, 46, 47 and 48 to operate them in the manner indicated to shut off the flow of the heating fluid to the heater while at the same time opening the by-passes 41 and 42 and admitting cooling water to the coils of the heater. In practice, provisions may be made to retard or slow down the movement of the valve 48 in order to insure a sufficient element of time for the filling of the reservoir 45c. This may be done by inserting in the branch 48a a leak 48b, as indicated, or in any other suitable manner well understood in engineering.

In the manner described, the cooling of the heater coils may be carried to the desired degree and, at any rate, so that the formation of an insulating layer is substantially avoided.

During the interval of interruption of the milk flow, the temperature of the heating fluid in the circulating systems is maintained by the action of the regulators 23 and 31 in response to the action of bulbs 25, 29, and 32 and as soon as the milk flow is resumed, the heating operation is continued substantially from the temperature conditions at the time of the stoppage.

While I have described what I at the present time consider as a preferred embodiment of the invention, there obviously is a great deal of latitude as to the means and instrumentalities for carrying the invention into effect.

In the foregoing I have described the invention as applied to a particular form of heater, wherein milk or other liquid is passed over the outer surface in the form of a film or sheet. However, the invention is equally applicable to all forms of apparatus wherein the stoppage of flow of milk or the like under similar conditions induces the formation of a heat-insulating deposit or layer impairing the function and efficiency of the heater and the function and dependability of a temperature regulator associated with the heater. In the broader aspect, my invention purports to automatically effect a change in the heat-input to the heater in such proportions as to prevent or minimize the formation of a heat-insulating deposit when the milk or other liquid becomes temporarily stagnant in contact with the heating surface, irrespective of the particular form of the heater or the particular heat-exchange relation of the liquid to be heated and the heating surfaces.

I claim:

1. In apparatus of the character described, the combination with a heater defining heating surfaces, means for supplying heat to the heating surfaces and means for passing a liquid to be heated, in contact with the heating surfaces including means for controlling the flow of the liquid to the heater, of means responsive to the operation of said controlling means to stop the flow of the liquid for applying a cooling medium to the said heating surfaces, said last means also being responsive in the reverse operation of said controlling means to reestablish the flow of the liquid, for reestablishing the supply of heat to the heating surfaces.

2. In apparatus of the character described, the combination with a heater, means for passing a heating fluid through said heater and means for passing a liquid to be heated in heat exchange relation to said fluid within the heater including means for controlling the flow of the liquid to the heater, of means responsive to the operation of said controlling means to stop the flow of the liquid, for stopping the flow of the heating fluid through the heater and passing a cooling fluid therethrough.

3. In apparatus of the character described, the combination with a heater, means for passing a heating fluid through said heater and means for passing a liquid to be heated in heat exchange relation to said fluid within the heater including means for controlling the flow of the liquid to the heater, of means responsive to the operation of said controlling means to stop the flow of the liquid, for stopping the flow of the heating fluid through the heater and for passing a limited quantity of a cooling fluid therethrough.

4. In apparatus of the character described, the combination with a tubular heater, means for passing a heating fluid through the heating tubes and means for passing a liquid to be heated in heat exchange relation to the fluid in said tubes including means for controlling the flow of the liquid to the heater, of means responsive to the operation of said controlling means to stop the flow of the liquid, for stopping the flow of the heating fluid through the heating tubes and for passing during a predetermined period of time a cooling fluid through the heating tubes.

5. In apparatus of the character described, the combination with a heater comprising a tubular system, means for passing a heating fluid through the tubes of the system, and means for passing a liquid to be heated in heat exchange relation to the tubes of the system, including means for controlling the flow of the liquid to the heater, of means responsive to the operation of said controlling means to stop the flow of liquid to the heater, for stopping the flow of the heating fluid through the tubes of the system, said last-mentioned means being also responsive in the reverse operation of the said controlling means to reestablish the flow of liquid to the heater, for readmitting the flow of heating fluid through the tubes of the system.

6. In apparatus of the character described, the combination with a heater comprising a tubular system, means for passing a heating fluid through the tubes of the system, and means for passing a liquid to be heated in heat exchange relation to the tubes of the system, including means for controlling the flow of the liquid to the heater, of means responsive to the operation of said controlling means to stop the flow of liquid to the heater, for stopping the flow of the heating fluid through the tubes of the system and for passing a cooling fluid through the tube system, said last mentioned means being also responsive in the reverse operation of said controlling means to reestablish the flow of liquid to the heater, for readmitting the flow of heating fluid through the tubes of the system and for stopping the flow of cooling fluid therethrough.

7. In apparatus of the character described, the combination with a heater comprising a tubular system, means for passing a heating fluid through the tubes of the system and means for passing a liquid to be heated in heat exchange relation to the tubes of the system, including means for controlling the flow of liquid to the heater, of means responsive to the operation of the said controlling means to stop the flow of the liquid to the heater, for passing a cooling fluid through the tubes of the system, said last-mentioned means being also responsive in the reverse operation of the said controlling means to reestablish the flow of milk to the heater, for stopping the flow of the cooling fluid through the tubes of the system.

8. In apparatus of the character described, the combination with a heater comprising a tubular system, an intake conduit and a return conduit connected with the tubular system, means for circulating a heating fluid through the said conduits and through the tubular system and means for passing a liquid to be heated in heat exchange relation to the tubes of the system, including means for controlling the flow of the liquid to the heater, of means responsive to the operation of the said controlling means to stop the flow of the liquid to the heater, for cooling the tubes of the system, comprising a fluid connection between the said conduits in parallel to the tubular system to form a by-pass, said last-mentioned means including means for controlling the flow of fluid through the by-pass and for controlling the flow of fluid through the intake conduit between the by-pass and the tubular system.

9. In apparatus of the character described, the combination with a heater comprising a tubular system, an intake conduit and a return conduit connected with the tubular system, means for circulating a heating fluid through the said conduits and through the tubular system and means for passing a liquid to be heated in heat exchange relation to the tubes of the system, including means for controlling the flow of the liquid to the heater, of means responsive to the operation of the said controlling means to stop the flow of the liquid to the heater, for cooling the tubes of the system, comprising a fluid connection between the said conduits in parallel to the tubular system to form a by-pass, said last-mentioned means including means for controlling the flow of fluid through the by-pass, and means for controlling the flow of fluid through the intake conduit between the by-pass and the tubular system, means independent of the means controlling the by-pass and the intake conduit for passing a cooling fluid into the tubular system at the intake end thereof, and means for controlling the flow of the cooling fluid into the system.

10. In apparatus of the character described, the combination with a tubular heater, means for passing a heating fluid through the heating tubes and means for passing a liquid to be heated in heat exchange relation to the tubes including means for controlling the flow of the liquid to the heater, of means responsive to the operation of said controlling means to stop the flow of the liquid, for stopping the flow of the heating fluid through the heating tubes and for passing a cooling fluid through the heating tubes, comprising means for passing a cooling fluid into the tubular heater at the intake end thereof, means for controlling the flow of the heating fluid to the heater, means for controlling the flow of the cooling fluid to the heater, means responsive to the means controlling the flow of the liquid to the heater for interdependently operating the heating-fluid control means and the cooling-fluid control means to permit the flow of heating fluid through the system and prevent the flow of cooling fluid through the system when the liquid flows to the heater and to cut off the flow of heating fluid from the system and permit the flow of cooling fluid through the system when the flow of the liquid to the heater is stopped.

In testimony whereof I affix my signature.

RUSSELL C. KINSMAN.